(12) United States Patent
MacLeod et al.

(10) Patent No.: US 9,105,009 B2
(45) Date of Patent: Aug. 11, 2015

(54) EMAIL-BASED AUTOMATED RECOVERY ACTION IN A HOSTED ENVIRONMENT

(75) Inventors: Alexander Ian MacLeod, Seattle, WA (US); Charlie Chung, Tacoma, WA (US); Rajmohan Rajagopalan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 13/052,788

(22) Filed: Mar. 21, 2011

(65) Prior Publication Data

US 2012/0246703 A1 Sep. 27, 2012

(51) Int. Cl.
*G06Q 10/10* (2012.01)
*G06Q 10/06* (2012.01)

(52) U.S. Cl.
CPC ............ *G06Q 10/10* (2013.01); *G06Q 10/06* (2013.01); *G06Q 10/107* (2013.01)

(58) Field of Classification Search
CPC ..... G06Q 10/107; G06Q 10/06; G06Q 10/10; H04L 41/00
USPC ................................. 726/4, 26–29
See application file for complete search history.

(56) References Cited

U.S. PATENT DOCUMENTS

| | | | |
|---|---|---|---|
| 5,423,044 A | 6/1995 | Sutton et al. | |
| 5,564,016 A | 10/1996 | Korenshtein | |
| 5,911,143 A | 6/1999 | Deinhart et al. | |
| 6,151,643 A | 11/2000 | Cheng et al. | 710/36 |
| 6,335,972 B1 | 1/2002 | Chandersekaran et al. | |
| 6,678,826 B1 | 1/2004 | Kelly et al. | |
| 6,694,437 B1 | 2/2004 | Pao et al. | |
| 6,804,773 B1 | 10/2004 | Grigsby et al. | |
| 6,978,367 B1 | 12/2005 | Hind et al. | |
| 7,205,883 B2 | 4/2007 | Bailey | |
| 7,257,713 B2 | 8/2007 | Colvig et al. | |
| 7,426,654 B2 | 9/2008 | Adams, Jr. et al. | |
| 7,526,685 B2 | 4/2009 | Noy et al. | 714/47.2 |
| 7,630,480 B2 | 12/2009 | Fleck et al. | |
| 7,680,822 B1 | 3/2010 | Vyas et al. | |
| 7,698,430 B2 | 4/2010 | Jackson | 709/226 |
| 7,702,736 B2 | 4/2010 | Ouchi | |
| 7,734,670 B2 | 6/2010 | Poozhiyil et al. | 707/608 |
| 7,815,106 B1 | 10/2010 | McConnell | |
| 7,831,833 B2 | 11/2010 | Gaylor | |
| 7,950,051 B1 | 5/2011 | Spitz et al. | |
| 7,992,008 B2 | 8/2011 | Ashok et al. | |
| 8,046,558 B2 | 10/2011 | Ghose | |
| 8,195,488 B1* | 6/2012 | Taix et al. | 705/7.11 |
| 8,201,224 B1* | 6/2012 | Spertus | 726/4 |

(Continued)

OTHER PUBLICATIONS

U.S. Application entitled "Instance-Based Command Execution, Approval, and Notification Framework," having U.S. Appl. No. 13/154,660, filed Jun. 7, 2011.

(Continued)

*Primary Examiner* — Chau Le
(74) *Attorney, Agent, or Firm* — Louise Bowman; Jim Ross; Micky Minhas (57) ABSTRACT

Email-based recovery actions may be provided. A request from a user to perform an action may be received. If the user is determined not to have permission to perform the action, a message may be sent to a second user to approve the requested action. If the second user approves the requested action, the requested action may be performed.

18 Claims, 3 Drawing Sheets

(56) References Cited

U.S. PATENT DOCUMENTS

| | | | |
|---|---|---|---|
| 8,296,827 B2 | 10/2012 | Paganetti et al. | |
| 8,310,923 B1 | 11/2012 | Nordstrom et al. | |
| 8,438,647 B2 | 5/2013 | Jevans | |
| 8,458,455 B2 | 6/2013 | Anderson et al. | |
| 8,458,779 B2 | 6/2013 | Valentine et al. | |
| 8,793,790 B2 | 7/2014 | Khurana et al. | |
| 8,839,257 B2 | 9/2014 | Lukyanov et al. | |
| 8,881,249 B2 | 11/2014 | Nunn et al. | |
| 2001/0021926 A1 | 9/2001 | Schneck et al. | |
| 2002/0026592 A1 | 2/2002 | Gavrila et al. | |
| 2002/0035521 A1 | 3/2002 | Powers | |
| 2002/0147801 A1* | 10/2002 | Gullotta et al. | 709/223 |
| 2003/0037251 A1 | 2/2003 | Frieder et al. | |
| 2003/0115148 A1 | 6/2003 | Takhar | |
| 2003/0139962 A1 | 7/2003 | Nobrega et al. | 709/217 |
| 2004/0230530 A1 | 11/2004 | Searl et al. | |
| 2005/0050354 A1 | 3/2005 | Gociman | |
| 2005/0154744 A1* | 7/2005 | Morinville | 707/100 |
| 2005/0193041 A1 | 9/2005 | Bourbonnais et al. | |
| 2006/0005048 A1 | 1/2006 | Osaki et al. | |
| 2006/0048224 A1 | 3/2006 | Duncan et al. | |
| 2006/0075144 A1 | 4/2006 | Challener et al. | |
| 2006/0137007 A1 | 6/2006 | Paatero et al. | |
| 2006/0168079 A1* | 7/2006 | Shen et al. | 709/207 |
| 2006/0184675 A1 | 8/2006 | Salmre et al. | |
| 2006/0242690 A1 | 10/2006 | Wolf et al. | |
| 2006/0265599 A1 | 11/2006 | Kanai | |
| 2007/0028293 A1 | 2/2007 | Boerries et al. | |
| 2007/0083928 A1 | 4/2007 | Mattsson et al. | |
| 2007/0094334 A1* | 4/2007 | Hoffman et al. | 709/206 |
| 2007/0101434 A1 | 5/2007 | Jevans | |
| 2007/0124361 A1* | 5/2007 | Lowry et al. | 709/201 |
| 2007/0180100 A1* | 8/2007 | Biggs et al. | 709/224 |
| 2007/0185875 A1 | 8/2007 | Chang et al. | |
| 2007/0192416 A1* | 8/2007 | Gupta | 709/206 |
| 2007/0250920 A1 | 10/2007 | Lindsay | |
| 2007/0289019 A1 | 12/2007 | Lowrey | |
| 2007/0294258 A1 | 12/2007 | Caldwell et al. | |
| 2008/0098485 A1* | 4/2008 | Chiou | 726/27 |
| 2008/0103916 A1 | 5/2008 | Camarador et al. | |
| 2008/0123854 A1 | 5/2008 | Peel et al. | |
| 2008/0140778 A1* | 6/2008 | Banavar et al. | 709/205 |
| 2008/0154774 A1 | 6/2008 | Dennison et al. | |
| 2008/0155685 A1* | 6/2008 | Beilinson et al. | 726/21 |
| 2008/0168532 A1 | 7/2008 | Carter et al. | |
| 2008/0195936 A1 | 8/2008 | White et al. | |
| 2008/0276098 A1 | 11/2008 | Florencio et al. | |
| 2008/0287121 A1 | 11/2008 | Ebrom et al. | |
| 2008/0320310 A1 | 12/2008 | Florencio et al. | |
| 2009/0048881 A1 | 2/2009 | Keane et al. | |
| 2009/0055822 A1 | 2/2009 | Tolman et al. | |
| 2009/0094667 A1 | 4/2009 | Habeck et al. | |
| 2009/0104888 A1 | 4/2009 | Cox | |
| 2009/0119541 A1 | 5/2009 | Inoue et al. | |
| 2009/0193407 A1 | 7/2009 | Lepeska | |
| 2009/0210427 A1 | 8/2009 | Elder et al. | |
| 2009/0249284 A1 | 10/2009 | Antosz et al. | 717/104 |
| 2009/0271451 A1 | 10/2009 | Young et al. | |
| 2009/0319402 A1 | 12/2009 | Manista et al. | |
| 2009/0320088 A1* | 12/2009 | Gill et al. | 726/1 |
| 2009/0320107 A1 | 12/2009 | Corella | |
| 2009/0328023 A1 | 12/2009 | Bestland et al. | |
| 2010/0005510 A1 | 1/2010 | Weber et al. | |
| 2010/0011418 A1 | 1/2010 | Despain et al. | |
| 2010/0017589 A1 | 1/2010 | Reed et al. | |
| 2010/0023368 A1 | 1/2010 | Houba | |
| 2010/0031058 A1 | 2/2010 | Kito et al. | |
| 2010/0037056 A1 | 2/2010 | Follis et al. | |
| 2010/0063950 A1* | 3/2010 | Joshi et al. | 706/45 |
| 2010/0064072 A1 | 3/2010 | Tang et al. | |
| 2010/0087941 A1 | 4/2010 | Assaf et al. | |
| 2010/0091318 A1 | 4/2010 | Ferlitsch | |
| 2010/0169630 A1 | 7/2010 | Mirashrafi et al. | |
| 2010/0185451 A1 | 7/2010 | Choi et al. | |
| 2010/0188287 A1 | 7/2010 | Madsen et al. | |
| 2010/0205421 A1 | 8/2010 | Campbell et al. | |
| 2010/0212008 A1 | 8/2010 | Jaganathan et al. | |
| 2010/0218012 A1 | 8/2010 | Joseph et al. | |
| 2010/0242041 A1 | 9/2010 | Plondke et al. | |
| 2010/0250939 A1 | 9/2010 | Adams et al. | |
| 2010/0257346 A1 | 10/2010 | Sosnosky et al. | |
| 2010/0257579 A1 | 10/2010 | Karjoth et al. | |
| 2010/0257596 A1 | 10/2010 | Ngo et al. | |
| 2010/0278078 A1 | 11/2010 | Proulx et al. | |
| 2011/0023107 A1 | 1/2011 | Chen et al. | |
| 2011/0061093 A1 | 3/2011 | Korkus et al. | |
| 2011/0078497 A1 | 3/2011 | Lyne et al. | |
| 2011/0099552 A1 | 4/2011 | Avni et al. | |
| 2011/0099616 A1 | 4/2011 | Mazur et al. | |
| 2011/0126111 A1 | 5/2011 | Gill et al. | |
| 2011/0191254 A1* | 8/2011 | Womack | 705/301 |
| 2011/0246426 A1 | 10/2011 | Cho | |
| 2011/0247066 A1 | 10/2011 | Lee | |
| 2011/0252404 A1 | 10/2011 | Park et al. | |
| 2011/0289588 A1 | 11/2011 | Sahai et al. | |
| 2011/0302632 A1 | 12/2011 | Garrett et al. | |
| 2012/0016621 A1 | 1/2012 | Tan et al. | |
| 2012/0096306 A1 | 4/2012 | Akirav et al. | |
| 2012/0144234 A1 | 6/2012 | Clark et al. | |
| 2012/0185911 A1 | 7/2012 | Polite et al. | |
| 2012/0185933 A1 | 7/2012 | Belk et al. | |
| 2012/0209884 A1 | 8/2012 | Mattsson et al. | |
| 2012/0239822 A1 | 9/2012 | Poulson et al. | |
| 2012/0259720 A1 | 10/2012 | Nuzzi | |
| 2012/0266246 A1 | 10/2012 | Amit et al. | |
| 2012/0317132 A1 | 12/2012 | Brady et al. | |
| 2013/0024918 A1 | 1/2013 | Cramer et al. | |
| 2013/0024947 A1 | 1/2013 | Holland et al. | |
| 2013/0031070 A1 | 1/2013 | Ducharme et al. | |
| 2013/0111260 A1 | 5/2013 | Reddy et al. | |
| 2013/0132963 A1 | 5/2013 | Lukyanov et al. | |
| 2013/0133024 A1 | 5/2013 | MacLeod et al. | |
| 2013/0239166 A1 | 9/2013 | MacLeod et al. | |
| 2014/0165167 A1 | 6/2014 | Nunn et al. | |

OTHER PUBLICATIONS

Huhns, M., et al.; "*Service-Oriented Computing: Key Concepts and Principles*"; IEEE Internet Computing Jan./Feb. 2005, IEEE Computer Society; 7 pgs.

Wright, T.; "*System Center Service Manager 2010 Release Candidate Released!!*"; Microsoft Corporation; Mar. 3, 2010; 3 pgs.

Kaufman, Charlie, et al.; "*Windows Azure™ Security Overview*"; Published Aug. 2010; 24 pgs. Obtained at: http://www.globalfoundationservices.com/security/documents/WindowsAzureSecurityOverview1_0Aug2010.pdf.

Publication entitled; "*PCI DSS Compliance in the UNIX/LINUX Datacenter Environment*"; Published Aug. 2009 by BeyondTrust Corporation; 19 pgs. Obtained at: http://i.zdnet.com/whitepapers/BeyondTrust_PCIDSSComplianceintheUNIXLinuxDatacenterEnvironment.pdf.

Wright, T.; "*System Center Service Manager 2010 Release Candidate Released!!* "; Microsoft Corporation; Mar. 3, 2010; 3 pgs.

U.S. Appl. No. 13/301,872, filed Nov. 22, 2011, entitled "Auto-Approval of Recovery Actions Based on an Extensible Set of Conditions and Policies".

U.S. Appl. No. 13/302,064, filed Nov. 22, 2011, entitled "Superseding of Recovery Actions Based on Aggregation of Requests for Automated Sequencing and Cancellation".

U.S. Appl. No. 13/413,078, filed Mar. 6, 2012, entitled "Operating Large Scale Systems and Cloud Service with Zero-Standing Elevated Permissions".

Stanger, Mark, article entitled "Change Management Workflow Approval Scripts in Service-now.com" Published on Oct. 20, 2010. Available at: http://www.servicenowguru.com/scripting/change-management-workflow-approval-scripts-servicenowcom/.

"Change Management Process" Version 1.0—Published Date: May 1, 2006. Available at: http://its.uncg.edu/Service_Management/Change/ChangeManagementProcess.pdf.

Kadar, et al, article entitled "Automatic Classification of Change Requests for Improved IT Service Quality"—Published Date: Mar.

(56) References Cited

OTHER PUBLICATIONS 29, 2011. In proceedings of Annual SRII Global Conference, Mar. 29, 2011, pp. 430-439. Available at: http://ieeexplore.ieee.org/stamp/stamp.jsp?tp=&arnumber=5958118.
"BMC Remedy Change Management 7.0 User's Guide"—Published Date: Jun. 2006; 410 pages. Available at: http://idbdocs.iadb.org/wsdocs/getdocument.aspx?docnum=35595995.
Batishchev, Alexander, M. article entitled, "Getting Elevated privileges on Demand Using C#," published Sep. 9, 2010; 4 pages. Available at: http://www.codeproject.com/KB/vista-security/ElevatedPrivilegesDemand.aspx.
Chun-Ying Huang et al., Using one-time passwords to prevent password phishing attacks. J Network Computer Applications (2011), doi:10.1016/j.jnca. 2011.02.004.
Dinei Florencio et al., One-Time Password Access to Any Server without Changing the Server, 11th International conference on Information Security '08, Taipei. Sep. 15, 2008.
Joseph Bonneau et al., The Quest to Replace Passwords: A Framework for Comparative Evaluation of Web Authentication Schemes, IEEE Symposium on Security and Privacy (SP), 2012, May 20, 2012.
Lockbox. Printed Nov. 20, 2012. Lockbox: Technology Platform, 3 pgs. http://www.lock-box.com/technology-platform/.
Stoneware. Printed Nov. 21, 2012. Single Sign-on, 3 pgs. http://www.stone-ware.com/webnetwork/lenovo/sso.
U.S. Official Action dated Nov. 1, 2012 in U.S. Appl. No. 13/154,660.
U.S. Official Action dated Jan. 14, 2013 in U.S. Appl. No. 13/301,872.
U.S. Appl. No. 13/712,688, filed Dec. 12, 2012, entitled "Scalable and Automated Secret Management".
Microsoft SQL Server 2008R2 Master Data Services. Printed Date: Oct. 4, 2011. "Master Data Services Environment, Master Data Services Training Guide." 2010. http://download.microsoft.com/download/5/9/F/59F1639E-EF57-4915-8848-EF1DC2157EBB/02%20MDS%20Environment.pdf.
IBM. Printed Date: Oct. 4, 2011. "IBM Tivoli Business Continuity Process Manager." http://www-01.ibm.com/software/tivoli/products/business-continuity-process-mgr/features.html.
Microsoft TechNet. "Deployment Planning, Architecture, and Guidance on System Center Service Manager." Published Oct. 2010. http://technet.microsoft.com/en-us/library/gg281359.aspx.
Travis Wright. "Automating IT: SCSM, SCCM, SCOM, SCVMM, Opalis—Better Together." Microsoft System, Center Service Manager. Published Aug. 25, 2010. http://blogs.technet.com/b/servicemanager/archive/2010/08/25/automating-it-scsm-sccm-scom-scvmm-opalis-better-together.aspx.
U.S. Office Action dated Apr. 19, 2013 cited in U.S. Appl. No. 13/413,078.
U.S. Office Action dated May 2, 2013 cited in U.S. Appl. No. 13/154,660.
U.S. Final Office Action dated Sep. 24, 2013 cited in U.S. Appl. No. 13/413,078, 46 pgs.
U.S. Office Action dated Sep. 30, 2013 cited in U.S. Appl. No. 13/154,660.
U.S. Office Action dated Sep. 30, 2013 cited in U.S. Appl. No. 13/301,872.
U.S. Office Action dated Jan. 30, 2014 cited in U.S. Appl. No. 13/302,064, 49 pgs.
U.S. Office Action dated Feb. 24, 2014 cited in U.S. Appl. No. 13/413,078, 44 pgs.
U.S. Office Action dated Dec. 18, 2013 cited in U.S. Appl. No. 13/712,688.
U.S. Final Office Action dated Mar. 24, 2014 cited in U.S. Appl. No. 13/154,660, 31 pgs.
U.S. Office Action dated Apr. 22, 2014 cited in U.S. Appl. No. 13/301,872, 56 pgs.
U.S. Final Office Action dated Aug. 8, 2014 cited in U.S. Appl. No. 13/413,078, 56 pgs.
U.S. Final Office Action dated Aug. 27, 2014 cited in U.S. Appl. No. 13/301,872, 55 pgs.
U.S. Office Action dated Sep. 8, 2014 cited in U.S. Appl. No. 13/154,660, 36 pgs.
U.S. Office Action dated Dec. 31, 2014 cited in U.S. Appl. No. 13/413,078, 40 pgs.
U.S. Final Office Action dated Mar. 25, 2015 cited in U.S. Appl. No. 13/154,660, 33 pgs.
U.S. Office Action dated Jun. 18, 2015 cited in U.S. Appl. No. 13/413,078, 43 pgs.
U.S. Final Office Action dated Jun. 25, 2015 cited in U.S. Appl. No. 13/301,872, 54 pgs.

\* cited by examiner

EMAIL-BASED AUTOMATED RECOVERY ACTION IN A HOSTED ENVIRONMENT

BACKGROUND

An email-based automated recovery action may provide a mechanism for authorizing operations in a hosted environment. In conventional systems, engineers and operators are typically allowed to perform only certain read-only operations in the hosted environment in order to minimize service disruptions. When a service incident occurs, however, engineers are not allowed to perform certain automated recovery actions in the environment by an automation framework. Thus, in some situations, the limits enforced by the automation framework may result in greater service disruption due to an engineer's or operator's inability to repair an active problem.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Email-based recovery actions may be provided. A request from a user to perform an action may be received. If the user is determined not to have permission to perform the action, a message may be sent to a second user to approve the requested action. If the second user approves the requested action, the requested action may be performed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Email-based recovery actions may allow engineers (e.g., product developers) and operators (e.g., support personnel, IT, and/or technicians) to perform normally prohibited disruptive actions on application servers, such as e-mail and/or web servers. For example, an engineer may need to restart an e-mail processing service to apply a critical update, but may normally not have permission to take such a production service offline. Upon receiving the engineer's request, an automation framework may recognize that the engineer does not have the required permission. Instead of denying the request, the automation framework may forward the request to an approval manager. For example, an e-mail, instant message, text message, and/or web alert may be sent and/or displayed to the approval manager. The approval manager may evaluate the request and then approve or deny the engineer's ability to perform the disruptive action. Such an approval may comprise a one-time approval, the engineer may be approved to perform the same action for a limited time window, and/or the engineer may be granted permanent permissions to perform such actions in the future.

Figure 1:
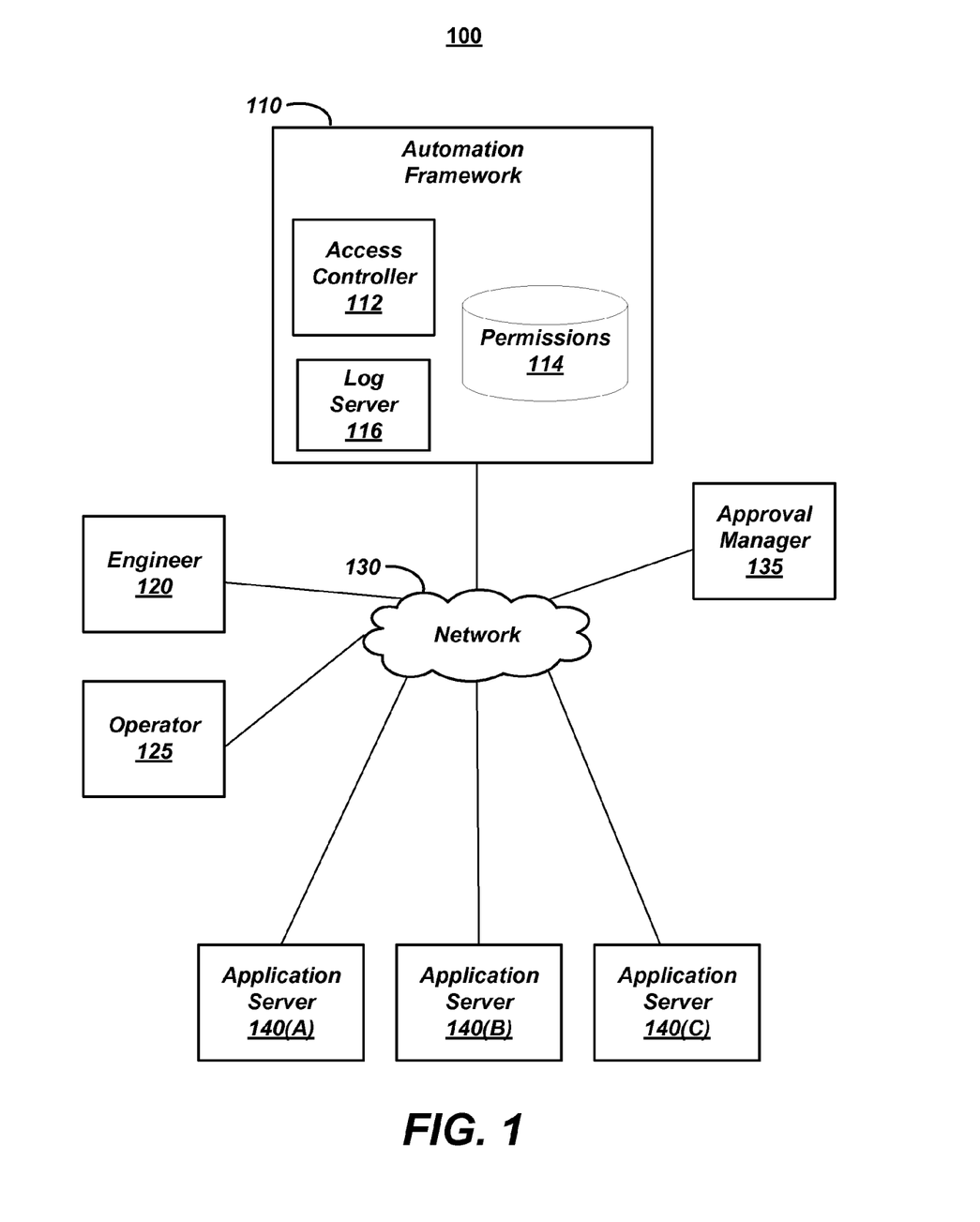
FIG. 1 is a block diagram of an operating environment.

FIG. 1 is a block diagram of an operating environment 100 comprising an automation framework 110. Automation framework 110 may comprise an access controller 112, a permissions database 114, and a log server 116. Automation framework 110 may receive action requests from an engineer 120 and/or an operator 125 via a network 130. Action requests may be evaluated by access controller 112 against permissions database 114. Approval requests may then be sent to an approval manager 135. Upon receiving an approval or denial of the request from approval manager 135, the result may be reported to log server 116. If the action request is approved, the action may be performed on one or more of a plurality of application servers 140(A)-(C).

Figure 2:
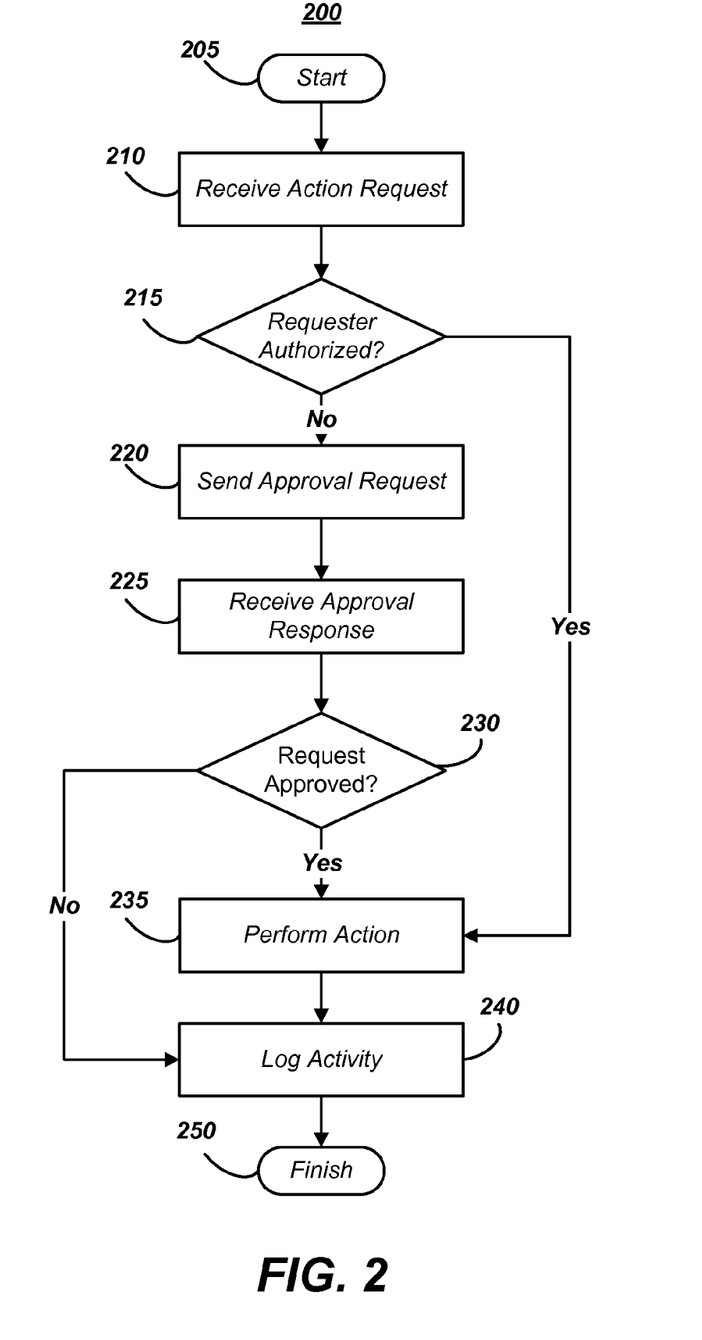
FIG. 2 is a flow chart of a method for providing email-based recovery actions.

FIG. 2 is a flow chart setting forth the general stages involved in a method 200 consistent with an embodiment of the invention for providing email-based recovery actions. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive an action request from a first user. For example, the first user may comprise operator 125 or engineer 120 who only has permission to perform read-only operations on application servers 140(A)-(C). Engineer 120 may, for example, request that a restart operation be performed on application server 140(A) in order to update the application.

From stage 210, method 200 may advance to stage 215 where computing device 300 may determine whether the first user has permission to perform the action. For example, automation framework 110 may determine whether operator 125 belongs to an administrative user group. Each user group may comprise a set of permissions recorded in permissions database 114 that may control what actions the users associated with that group may perform. For example, users belonging to an operator user group may be allowed to read log entries associated with application servers 140(A)-(C) but may not be allowed to start or stop those services. Consistent with embodiments of the invention, different users and/or groups may have different permissions for different application servers. Users belonging to an administrative user group may have elevated permissions, including the ability to perform actions that may result in service disruptions.

If, at stage 215, computing device 300 determines that the user does not have permission to perform the action, method 200 may advance to stage 220 were computing device 300 may send an approval request to at least one second user. For example, the approval request may comprise a problem summary received from the first user and a command text associated with the requested action. Automation framework 110 may send the approval request via email over network 130 to approval manager 135.

Method 200 may then advance to stage 225 where computing device 300 may receive a response to the approval request from the at least one second user. For example, approval manager 135 may reply to the email approving or denying the request. For another example, approval manager 135 may simply select a user interface control associated with the email message indicating whether they approve or deny the request, much as a meeting request may be accepted or rejected.

Method 200 may then advance to stage 230 where computing device 300 may determine whether the at least one second user has approved the requested action. For example, approval manager 135 may review the details of the requested action and approve the performance of the requested action.

In response to determining that the at least one second user has approved the requested action, or after determining that the user has sufficient permissions to perform the requested action, method 200 may advance to stage 235 where computing device 300 may perform the requested action. For example, automation framework 110 may execute the requested restart action on application server 140(A).

After performing the action at stage 235, or if the request was denied at stage 230, method 200 may advance to stage 240 where computing device 300 may create a log entry associated with the requested action. For example, the log entry may comprise a name of the first user, a name of the second user, the problem summary received from the first user, the command text associated with the requested action, and/or a result associated with performing the requested action.

An embodiment consistent with the invention may comprise a system for providing email-based recovery actions. The system may comprise a memory storage and a processing unit coupled to the memory storage. The processing unit may be operative to receive a request from a user to perform an action, determine whether the user has permission to perform the action, and in response to determining that the user does not have permission to perform the action, send a message to a second user to approve the requested action. The processing unit may be further operative to determine whether the second user has approved the requested action, and, in response to determining that the second user has approved the requested action, perform the requested action. The approval message may be sent, for example, as an e-mail message, an instant message, a web page notification, and/or a text message. The approval or denial of the request may be received by the same and/or a different channel than the request was originally sent. Being operative to determine whether the user has permission to perform the action may comprises being operative to determine whether the user is associated with an administrative user group. The approval and/or denial of the request may be logged along with the user who requested the action, the user who approved/denied the action, and/or a result of performing the action.

Another embodiment consistent with the invention may comprise a system for providing email-based recovery actions. The system may comprise a memory storage and a processing unit coupled to the memory storage. The processing unit may be operative to receive an action request from a first user, determine whether the first user has permission to perform the action, and in response to determining that the user does not have permission to perform the action, send an approval request to at least one second user via email to approve the requested action, receive a response to the approval request from the at least one second user via email, and determine whether the at least one second user has approved the requested action. In response to determining that the at least one second user has approved the requested action, the processing unit may be operative to perform the requested action. The approval request may comprise an impact analysis associated with performing the action request, a problem summary associated with the action request received from the first user, and/or a command text associated with the requested action. For example, the approval request may comprise the exact wording of the command associated with performing the requested action. The action request may be associated with an application service, such as a web server and/or an e-mail server. The approval request may be sent to a plurality of users each of whom may be associated with an administrative user group.

Yet another embodiment consistent with the invention may comprise a system for providing email-based recovery actions. The system may comprise a memory storage and a processing unit coupled to the memory storage. The processing unit may be operative to receive an action request from a first user, determine whether the first user has permission to perform the action, and, in response to determining that the user does not have permission to perform the action, send an approval request to at least one second user to approve the requested action, receive a response to the approval request from the at least one second user, and determine whether the at least one second user has approved the requested action. In response to determining that the at least one second user has approved the requested action, the processing unit may be operative to perform the requested action and create a log entry associated with the requested action. The log entry may comprise a name of the first user, a name of the second user, the problem summary received from the first user, the command text associated with the requested action, and a result associated with performing the requested action. In response to determining that the user does have permission to perform the action, the processing unit may be operative to perform the action and log the performance of the action.

Figure 3:
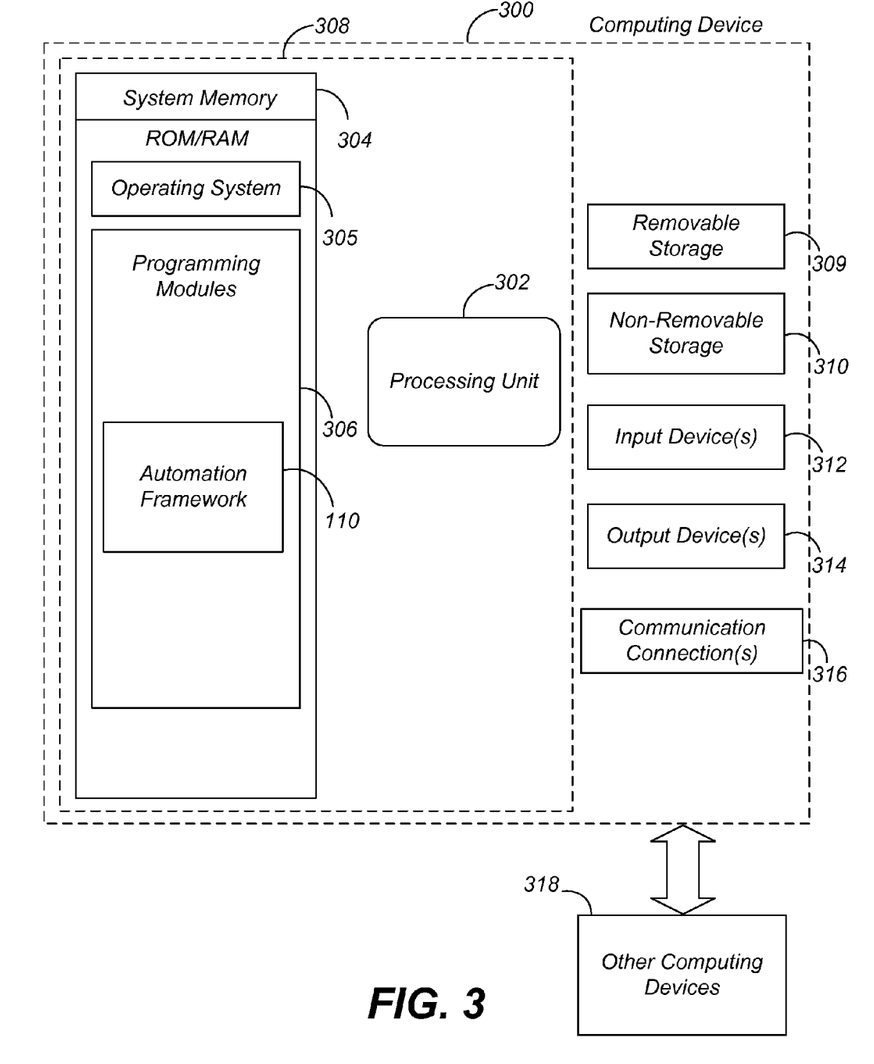
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 100 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include automation framework 110. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, and/or program modules, and includes any information delivery media. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., automation framework 110) may perform processes including, for example, one or more of method 300's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing server-based recovery actions, the method comprising:
   receiving a request from a first user to perform a recovery action on a server;
   determining whether the first user has permission to perform the recovery action based on a permissions database, wherein determining whether the first user has permission to perform the recovery action comprises:
      determining a user group to which the first user belongs, and
      determining whether the determined user group to which the first user belongs has permission to perform the recovery action;
   in response to determining that the first user does not have permission to perform the recovery action, sending an approval request to a second user associated with an administrative user group via an email to approve the recovery action, wherein sending the approval request comprises sending the approval request comprising the received request, an impact analysis of performing the recovery action requested in the received request, and a command text for the recovery action requested in the received request;
   receiving a response to the approval request from the second user;
   determining whether the second user has approved the recovery action, wherein determining whether the second user has approved the recovery action comprises receiving a permissible scope; and
   in response to determining that the second user has approved the recovery action, performing the recovery action on the server.

2. The method of claim 1, wherein the response to the approval request is received via a same channel as the request was forwarded.

3. The method of claim 1, wherein the response to the approval request is received via a different channel than the request was forwarded.

4. The method of claim 1, wherein the recovery action comprises a reboot action.

5. The method of claim 1, wherein determining whether the first user has permission to perform the recovery action comprises determining whether the first user is associated with an administrative user group.

6. The method of claim 1, further comprising logging the recovery action.

7. The method of claim 6, further comprising logging the first user who requested the recovery action.

8. The method of claim 7, further comprising logging whether the recovery action was approved.

9. The method of claim 8, further comprising logging a result associated with performing the recovery action.

10. The method of claim 1, wherein forwarding the approval request to the second user comprises:
   determining, from the permissions database, a plurality of users associated with the administrative user group, the administrative user group having elevated permissions comprising an ability to perform the recovery action; and
   selecting the second user from the determined plurality of users associated with the administrative user group.

11. The method of claim 1, wherein receiving the response to the approval request from the second user receiving the response in view of the second user selecting an user interface control associated the email indicating approval of the request.

12. A computer-readable storage device which stores a set of instructions which when executed performs a method for providing server-based recovery actions, the method executed by the set of instructions comprising:
   receiving an approval request from a first user to perform a recovery action on a server;
   determining whether the first user has permission to perform the recovery action based on a permissions database, wherein determining whether the first user has permission to perform the recovery action comprises:
      determining a user group to which the first user belongs, and
      determining whether the determined user group to which the first user belongs has permission to perform the recovery action; and
   in response to determining that the first user does not have permission to perform the recovery action:
      forwarding the approval request to at least one second user associated with an administrative user group via email to approve the recovery action, wherein forwarding the approval request comprises creating a permission request comprising the received approval request, an impact analysis of performing the recovery action requested in the approval request, and a command text for the recovery action requested in the approval request,
      receiving a response to the approval request from the at least one second user via email,
      determining whether the at least one second user has approved the recovery action, wherein determining whether the at least one second user has approved the recovery action comprises determining that the response includes a permissible scope, and in response to determining that the at least one second user has approved the recovery action, performing the recovery action.

13. The computer-readable storage device of claim 12, wherein the approval request comprises a problem summary associated with the action request.

14. The computer-readable storage device of claim 13, wherein the problem summary is received from the first user along with the approval request.

15. The computer-readable storage device of claim 12, wherein the recovery action request is associated with an application service.

16. The computer-readable storage device of claim 12, wherein the approval request is sent to a plurality of users and wherein the plurality of users are each associated with an administrative user group.

17. The computer-readable storage device of claim 12, further comprising logging the action request, the first user, a result associated with performing the recovery action, and the second user's approval of the action request.

18. A system for providing server-based recovery actions, the system comprising:

a memory storage; and a processing unit coupled to the memory storage, wherein the processing unit is configured to:

receive a request from a first user to perform a recovery action on a server, wherein the first user comprises at least one of the following: an operator and an engineer, determine whether the first user has permission to perform the recovery action based on, wherein being operative to determine whether the first user has permission to perform the recovery action comprises being operative to determine:

a user group to which the first user belongs to, and whether the determined user group to which the first user belongs has permission to perform the recovery action, in response to determining that the first user does not have permission to perform the recovery action:

forwarding the request to at least one second user associated with an administrative user group to approve the recovery action via at least one of the following channels: an e-mail message, an instant message, a web page notification, and a text message, wherein the approval request comprises an impact analysis associated with performing the recovery action, a problem summary received from the first user, and a command text associated with the recovery action;

receive a response to the approval request from the at least one second user;

determine whether the at least one second user has approved the recovery action, wherein the processing unit being operative to determine whether the at least one second user has approved the recovery action comprises the processing unit being operative to determine that the response includes a permissible scope;

in response to determining that the at least one second user has approved the recovery action; and create a log entry associated with the recovery action, wherein the log entry comprises a name of the first user, a name of the at least one second user, the problem summary received from the first user, the command text associated with the recovery action, and a result associated with performing the recovery action; and in response to determining that the first user does have permission to perform the recovery action, perform the recovery action.

\* \* \* \* \*